(No Model.)
J. GATES.
HOSE COUPLING.
No. 533,708. Patented Feb. 5, 1895.
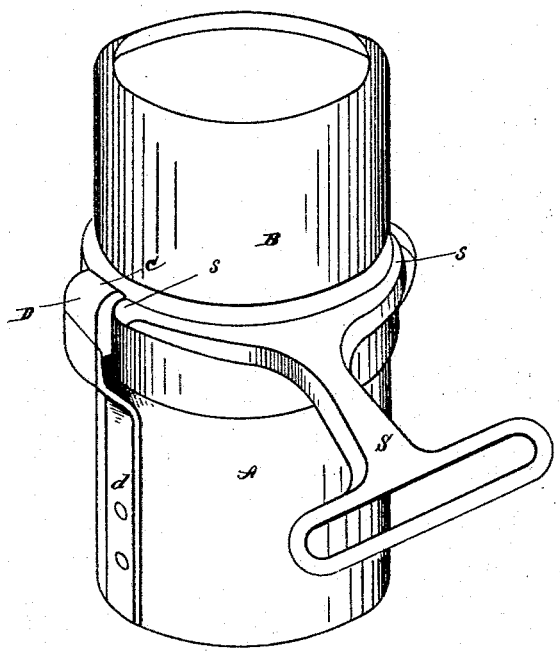
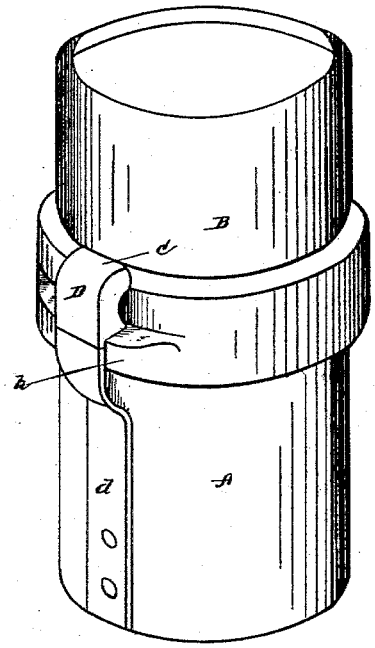
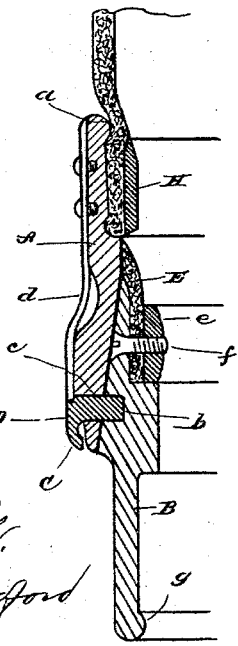
WITNESSES
F. Clough.
D. W. Bradford.
INVENTOR
James Gates
By Parker & Burton
Attorneys.

UNITED STATES PATENT OFFICE.

JAMES GATES, OF WALLACEBURG, CANADA, ASSIGNOR OF ONE-HALF TO WINFIELD S. WOOLIVER AND GEORGE REED, OF SAME PLACE.

HOSE-COUPLING.

SPECIFICATION forming part of Letters Patent No. 533,708, dated February 5, 1895.

Application filed March 9, 1894. Serial No. 502,998. (No model.)

*To all whom it may concern:*

Be it known that I, JAMES GATES, a citizen of Canada, residing at Wallaceburg, in the county of Kent and Province of Ontario, Canada, have invented a certain new and useful Improvement in Hose-Couplings; and I declare the following to be a full, clear, and exact description of the invention, such as will enable others skilled in the art to which it pertains to make and use the same, reference being had to the accompanying drawings, which form a part of this specification.

This invention relates to hose couplings, and has for its object an improvement by which the combined pieces of which the coupling is composed, are brought into more compact form; by which the coupling action is brought about by simply inserting one of the coupling pieces into the other without screw action, by which the coupling itself, when the parts are joined, forms a swivel joint such that one length of hose can turn with respect to the other, and by which the coupling joint is entirely water tight and able to resist any pressure that will ordinarily be used.

In the drawings, Figure 1 shows the coupling in perspective. Fig. 2 shows it with the spanner by which the parts are separated, inserted under the holding locks. Fig. 3 is a section showing the connection between the two parts.

The coupling consists essentially of two rings, A and B, of which A, the external ring, is provided at its mouth or coupling end with a conical bore, largest at the outer end, and narrowing toward the inner or hose end of the coupling or ring A. The coupling end of the ring B is provided with an external cone which is smallest at the extreme forward or coupling end, and enlarges gradually toward the hose end. The conical outer surface of the ring B and the conical inner surface of the ring A have the same taper and fit closely the one within the other. The ring B back of its forward end, but on that portion of it which is finished with the conical surface just described, is provided with an annular groove $b$; and the ring A, near its outer or coupling end, has two holes, $c$, cut through it, and in each of these holes is inserted a lock D, the inner end of which lock lies within the coupling ring A, and can project far enough to engage with the groove $b$. The spring $d$, secured to the external walls of the coupling ring A, holds the lock D with its inner end projecting through the walls of the ring A, and into the groove $b$. Each one of the locks D is provided with an ear, C, under which the point $s$ of the spanner S can be pushed. Within the interior of the ring B, and at the forward or coupling end of it, is a rubber packing ring E held to place by an interior holding ring $e$ which is secured in place by screws $f$ that pass through the body of the coupling ring B through the rubber washer E, and through the holding ring $e$. The forward end of the packing ring E is beveled so as to produce at its extreme forward end a somewhat thin, narrow edge, and this edge is held by the resiliency of the rubber itself in close contact with the inner walls of the ring A. The rear or hose end of each of the coupling pieces A and B, is provided with an interior ledge, one being shown at $a$, and the other at $g$. These aid in securing the hose to the coupling ring, and the hose is made fast to the coupling ring, by inserting it in place, and inserting within it a holding ring H.

The two ends of the coupling engage the one within the other, and by reason of the coned engaging surfaces make a reasonably tight joint; but, inasmuch as it is desirable that there shall be freedom of circular movement of one part within the other, this joint cannot be absolutely tight, and it is aided by the rubber packing ring E, the forward or free end of which, projecting beyond the forward end of the ring B to which it is secured, bears closely against the inner side of the ring A, and under pressure of the stream of water expands strongly against the inner wall, and makes a perfectly tight joint. By reason of the coned shape of the opening in the mouth of the ring A, there is never any difficulty in inserting the forward end of the rubber ring E in the coupling ring A, and, as soon as inserted, it is pushed to its place with great readiness.

It will be noticed that the coned part of the interior surface of the ring A does not extend backward toward the hose end of that ring as far as it is intended to have the end of the rubber packing ring E extend; that for a short space between the end of the cone and the end of the hose, the interior surface of the ring A is cylindrical; or it may even, if desired, be slightly coned in the reverse direction, and this enables me to make the rubber packing ring of as large, or perhaps slightly larger, external diameter than the internal diameter of this cylindrical portion, thus insuring a close and accurate contact between the rubber ring and the coupling ring.

On each side of the lock D, behind the ear C, is a guard $h$, which serves to protect both the lock D and the end of the spring $d$ from being accidentally injured when the hose is in use.

In order to make a coupling, it is only necessary to insert the end of the ring B in the mouth of the ring A, and push the parts together. The lock D rides over the coned part of the ring B until it comes to position to engage with the groove $b$. It then falls into the groove $b$, and the parts are held firmly in place with freedom of turning the one within the other as already described. In order to uncouple the parts, the two points of the spanner S must be placed under the ears C and forced under them until the locks D are lifted out of a groove $b$. The coupling then readily comes in two.

What I claim is—

1. In a hose coupling, the combination of an external part having a coned mouth expanding outwardly, an internal part having an external surface adapted to engage the coned mouth in said external part, an annular groove in the internal part, holes in the external part, locks adapted to be loosely carried in said holes and to engage said annular groove, springs secured by one end to the external part and having their free ends adapted to engage the top of the locks whereby said locks are held in engagement with the annular groove, a tubular packing ring adapted to be held in the end of the internal part and having its outer edge beveled and expanded to engage the inner cylindrical walls of the external part, substantially as described.

2. In a hose coupling, the combination of the external part A, the internal part B, the annular groove $b$, in the internal part, the holes $c$, in the external part, the tubular packing ring E, adapted to be held in the inner end of the internal part by means of the internal ring $e$, and screw $f$, and having its outer edge beveled and expanded to engage the inner cylindrical walls of the external part; with the lock D, provided with the ears C, adapted to be loosely carried in the holes $c$, and to engage the annular groove $b$; the springs $d$, secured at one end to the external part and having their free ends adapted to engage the top of said locks whereby they are held into engagement with said annular groove, substantially as described.

In testimony whereof I sign this specification.

his
   JAMES × GATES.
      mark

In presence of—
 C. B. JACKSON,
 A. FISHER.